(12) United States Patent
Puttichaem (10) Patent No.: US 12,155,295 B2
(45) Date of Patent: Nov. 26, 2024

(54) SHAFTLESS HORIZONTAL AXIS WIND TURBINE

(71) Applicant: Wachira Puttichaem, Bangkok (TH)

(72) Inventor: Wachira Puttichaem, Bangkok (TH)

( * ) Notice: Subject to any disclaimer, the term of this patent is extended or adjusted under 35 U.S.C. 154(b) by 0 days.

(21) Appl. No.: 17/776,973

(22) PCT Filed: Dec. 9, 2020

(86) PCT No.: PCT/TH2020/000081
§ 371 (c)(1),
(2) Date: May 13, 2022

(87) PCT Pub. No.: WO2021/118475
PCT Pub. Date: Jun. 17, 2021

(65) Prior Publication Data
US 2022/0393548 A1    Dec. 8, 2022

(30) Foreign Application Priority Data

Dec. 11, 2019   (TH) ................................ 1901007703

(51) Int. Cl.
*H02K 7/18*    (2006.01)
*F03D 15/00*   (2016.01)
(Continued)

(52) U.S. Cl.
CPC ............. *H02K 7/183* (2013.01); *F03D 15/00* (2016.05); *H02K 1/16* (2013.01); *H02K 1/278* (2013.01); *F05B 2240/14* (2013.01)

(58) Field of Classification Search
CPC ........ H02K 7/183; H02K 1/16; F05B 2240/14
See application file for complete search history.

(56) References Cited

U.S. PATENT DOCUMENTS

| | | | |
|---|---|---|---|
| 2012/0181792 | A1 | 7/2012 | Pettersen et al. |
| 2015/0295482 | A1* | 10/2015 | Cawthorne ............ H02K 16/04 |
| | | | 310/198 |
| 2018/0287437 | A1* | 10/2018 | Haran .................. H02K 1/2773 |

FOREIGN PATENT DOCUMENTS

| | | |
|---|---|---|
| CN | 1719028 A | 1/2006 |
| CN | 101389853 A | 3/2009 |

(Continued)

OTHER PUBLICATIONS

Puttichaem, W., PCT/TH2020/000081, International Search Report, Apr. 9, 2021, 4 pages.

(Continued)

*Primary Examiner* — Sean Gugger
(74) *Attorney, Agent, or Firm* — Rahman LLC (57) ABSTRACT

The invention relates to the shaftless horizontal axis wind turbine for generating electricity from the flow of fluid. The major components of the shaftless horizontal axis wind turbine consist of a stator and a rotor. The major components of the stator consist of a set of copper coils installed along a circular circumference of the stator frame and electrically connected as the Star connection (3-phase) circuit. The major components of the rotor consist of at least a set of the turbine blade, roller, and magnet set. The turbine blade has optimized an obtuse angle ($\theta_T$) of the turbine blade holder and a rotation angle ($\theta_R$) between the turbine blade holder and turbine blade to create the open channel in the middle of the shaftless horizontal axis wind turbine, which is shaped like a nozzle without shaft at the center of horizontal axis wind turbine.

9 Claims, 10 Drawing Sheets

(51) Int. Cl.
 *H02K 1/16* (2006.01)
 *H02K 1/278* (2022.01)

(56) References Cited

FOREIGN PATENT DOCUMENTS

| | | |
|---|---|---|
| CN | 202746108 U | 2/2013 |
| CN | 103259349 A | 8/2013 |
| CN | 106014856 A | 10/2016 |

OTHER PUBLICATIONS

Puttichaem, W., PCT/TH2020/000081, Written Opinion, Apr. 6, 2021, 3 pages.

* cited by examiner

SHAFTLESS HORIZONTAL AXIS WIND TURBINE

FIELD OF INVENTION

The present invention relates to the field of mechanical engineering, especially relates to the shaftless horizontal axis wind turbine

BACKGROUND OF THE INVENTION

Non-natural wind sources, such as the air discharged from ventilation systems, represent high-potential wind resources for generate electricity in countries with unreliable or weak wind flow. Examples of non-natural wind sources are the air discharged from ventilation systems in agricultural farms, chillers in manufacturing plants, and condensers from air conditioners in residential areas. The wind speed of the air discharged out of these ventilation systems has the required stability and strength when benchmarked against natural wind. The range of wind speeds, when measured at a 5 cm distance from the point of discharge, is 5 to 10 m/s.

Generally, the conventional horizontal axis wind turbine mainly consists of blades, shaft, and generator. The conventional horizontal axis wind turbine is designed to generate electricity from natural wind. The shaft of horizontal axis wind turbine was parallel to the direction of the wind. The turbine blade was assembled to the shaft and perpendicular to the wind movement. The turbine blades is the part absorbed the wind and convert kinetic energy into mechanical energy to transfer the force to the shaft. Then, the shaft generate torque to rotate the generator to generate electricity.

Even so, traditional wind turbines have limitations in that they tend to have a negative effect on the ventilation system efficiency which caused by discharged air flows backward into the ventilation system and that they are inconvenient to install or mount to the ventilation systems in the limited available area, particularly in urban settings. Traditional wind turbines need to be installed at least 2 meters (m) from the wind generator of the ventilation system to meet the ventilation system standard requirements. In addition, the motor of the ventilation fan consumes more electrical current when installed it close to wind generator of ventilation system. It is directly impact energy cost of whole system. The electrical power output of the traditional wind turbine is limited by the size of the generator and turbine blade diameter. The diameter of the turbine blade of the traditional horizontal axis wind turbine must be larger than the size of the generator to generate torque to drive the shaft of the generator. So, the traditional horizontal axis wind turbine is not widely used because it is not a cost-effective solution to generate electricity from the discharged air from ventilation system.

Many inventors had presented idea to generate electricity from the discharged air of ventilation system but there is no explicit solution to the solved limited of the horizontal axis wind turbines such as patents disclosed as WO2017/20054A1, U.S. Pat. No. 6,365,985B1, WO2011/153012A1, WO2012/149347A2, US2012/0280503A1, US005512788A, JP2010185445A, U.S. Pat. No. 8,939,724B2, and US2011/0293419A1. The above patents were designed based on the approach of the traditional horizontal axis wind turbines to generate electricity from the ventilation system, and need the various range of installation distance between the turbine and the ventilator from 20 centimeters (cm) to 1.5 meters (m) that are inconvenient to install or mount to the ventilation systems in the limited available area, particularly in urban settings. Thus, it is necessary to integrate both conventional approaches and new approaches in an innovative design and cost-effective for a wind turbine that can generate electricity from the air discharged from ventilation systems in the industrial sector, private sector, and urban areas for the sustainable development of energy.

SUMMARY OF THE INVENTION

The invention relates to the shaftless horizontal axis wind turbine for generating electricity from the flow of fluid. The major components of the shaftless horizontal axis wind turbine consist of a stator and a rotor. The major components of the stator consist of a set of copper coils installed along a circular circumference of the stator frame and electrically connected as the Star connection (3-phase) circuit. The major components of the rotor consist of at least a set of the turbine blade, roller, and magnet set. The turbine blade has optimized an obtuse angle ($\theta T$) of the turbine blade holder and a rotation angle ($\theta R$) between the turbine blade holder and turbine blade to create the open channel in the middle of the shaftless horizontal axis wind turbine, which is shaped like a nozzle. The roller wheels which are mounted to the rotor frame are applied to allow the rotor rotating positioning control to be maintained in the stator frame while the air stream of the discharged air flows through the blade set. Each magnet set consists of a magnet and a magnet holder. They are attached to the rotor frame. The shaftless horizontal axis wind turbine can generate electricity when the magnet sets of the rotor rotate across the coil sets which are fixed to the stator frame.

The principles of the SHWT are to produce electricity from man-made fluid flow, such as the waste wind from ventilation systems; to minimize the adverse effects on the performance of the ventilation system when it is deployed; and to be able to be implemented in limited space. Furthermore, the efficiency of the fluid ventilation from the system is maintained to meet the designed standard. The energy cost of the fluid current flow generator is not different from that of systems without being installed a shaftless turbine. Moreover, the shaftless horizontal axis turbine has a high potential to generate more electrical power output than the conventional horizontal axis turbines having the same rotor diameter. The shaftless turbine is capable of being applied to any fluid flow stream such as natural wind, the discharged air from a ventilation system, the liquid drained through pipelines by a mechanical power unit or by gravity, and so on.

BRIEF DESCRIPTION OF THE DRAWING

The invention is herein described, by way of example only, with reference to the accompanying drawings, wherein.

DETAILED DESCRIPTION OF THE INVENTION

Figure 1:
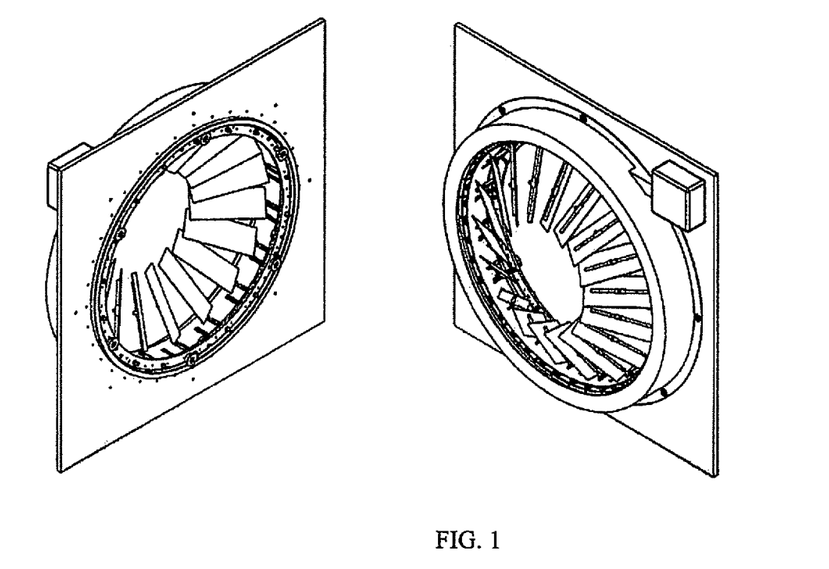
FIG. 1 illustrates one example of parts in a perspective view of the shaftless horizontal axis wind turbine.
Figure 2:
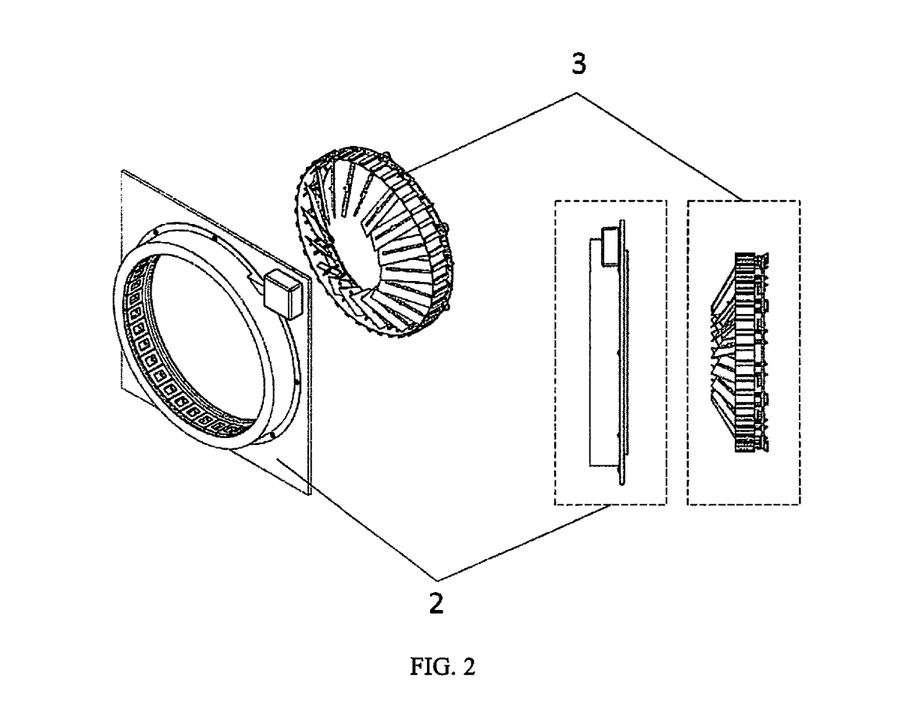
FIG. 2 illustrates one example of a stator and rotor of the shaftless horizontal axis wind turbine.

FIG. 1 and FIG. 2 illustrates examples of parts in a perspective view of the shaftless horizontal axis wind turbine for generating electricity from the current flow of fluid according to the invention comprising a stator (2) and a rotor (3).

Figure 3:
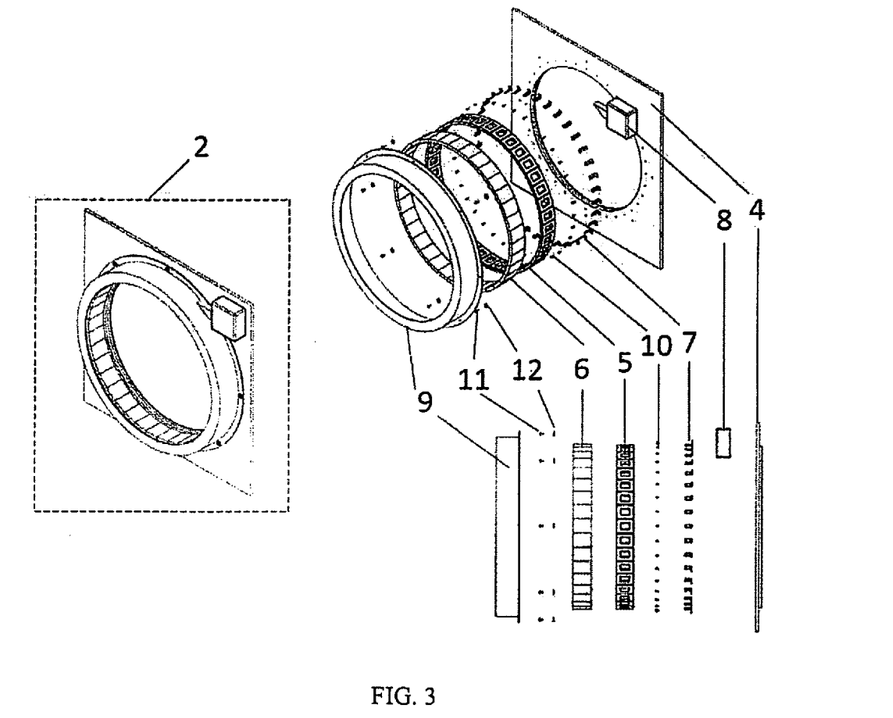
FIG. 3 illustrates one example of exploded view of the stator of the shaftless horizontal axis wind turbine.
Figure 5:
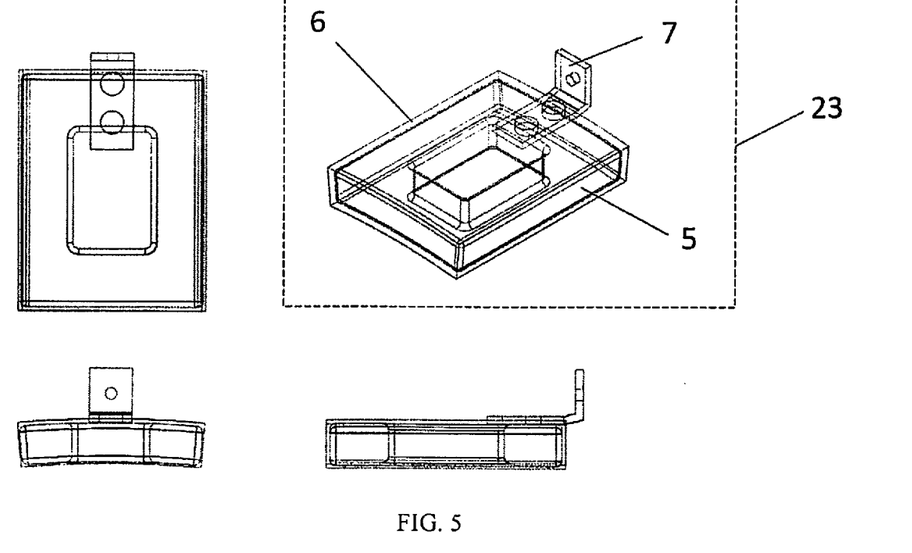
FIG. 5 illustrates one example of parts of a set of coils of the shaftless horizontal axis wind turbine.
Figure 6:
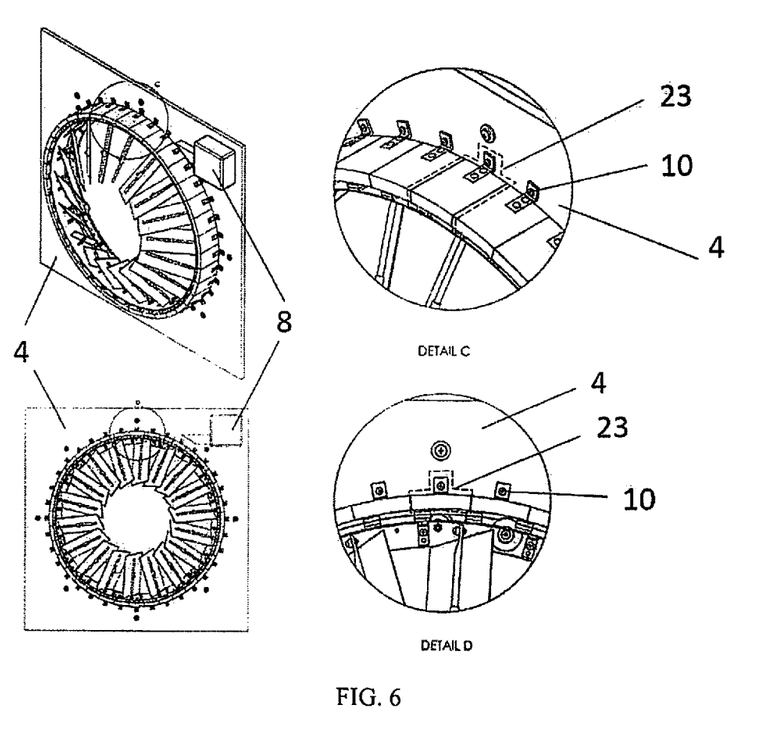
FIG. 6 illustrates one example of an installation method of the set of coils on the stator structure of the shaftless horizontal axis wind turbine.
Figure 7:
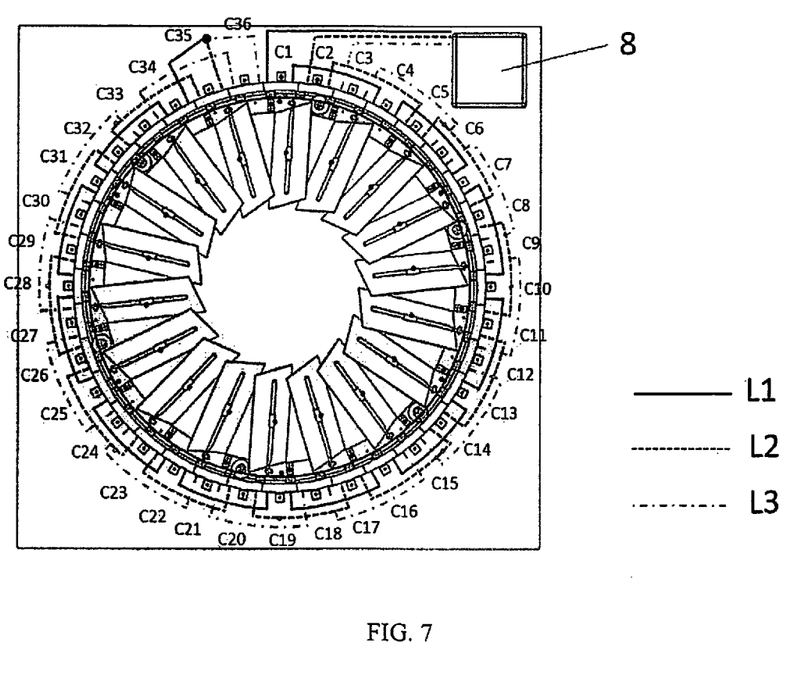
FIG. 7 illustrates one example of an electrical circuit connection in form of a Star connection (3-phase) circuit of the set of coils connection for the shaftless horizontal axis wind turbine.
Figure 8:
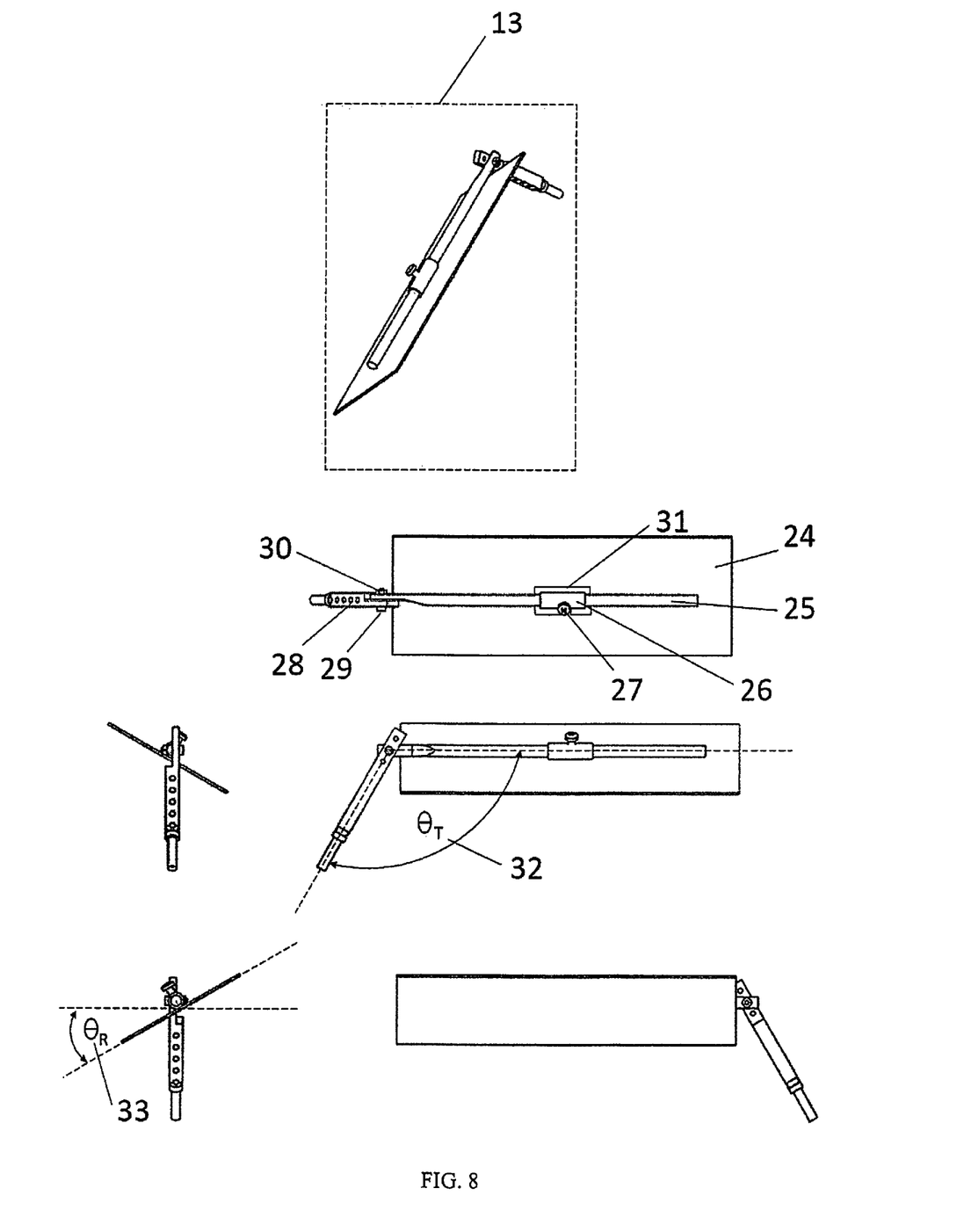
FIG. 8 illustrates one example of parts of a blade set of the shaftless horizontal axis wind turbine.

FIG. 3 illustrates one example of exploded view of the stator (2) of the shaftless horizontal axis wind turbine for generating electricity from the current flow of fluid according to the invention comprising:

a stator frame (4), preferably made of plastic, acrylic, or aluminum, having a plurality of thin plates as in any shape containing a circular-shape aperture larger than the rotor (3) having a clearance helping supporting rollers (34) and weight bearing rollers (35) of a roller unit (14) attached to a rotor frame (19), helping the rotor (3) rotate within the stator frame (4), wherein the stator frame (4) has a plurality of tap holes installed around the aperture for supporting a plurality of coil screws (10), by torque to allow the screws to penetrate onto the holes on the stator frame (4), attaching a plurality of coil sets (23) to the stator frame (4);

a coil set (23), according to FIG. 5, containing enameled conductive coil which winding is the air-core type (5) which is the centered-hollow square shape coil, where the coil set (23) is coated with anti-electrical or chemical reaction materials (6) made by non-conductive and anti-corrosion resin to prevent the electrical or chemical reactions with the conductive coil coated with air core insulators (5) and attached to a plurality of L-shape coil-holders (7) wherein the shorter part contains a hole for hooking up the coil set (23) with the stator frame (4) and the longer part contains a plurality of holes for hooking up the conductive coil coated with air core insulators (5) to form as one coil set (23) to be installed at the plurality of holes around the aperture of the stator frame (4), wherein a plurality of the coil sets (23) are orderly arranged as a circle, according to FIG. 6, and electrically connected as the 3-phase circuit of the Star (Y) connection, which is to separate all coil sets (23) into 3 sets wherein the first set (L1) contains a coil set (23) of C1, C4, C7, C10, C13, C16, C19, C22, C25, C28, C31, and C34, the second coil set (L2) contains a coil set (23) of C2, C5, C8, C11, C14, C17, C20, C23, C26, C29, C32, and C35, and the third set (L3) contains a coil set (23) of C3, C6, C9, C12, C15, C18, C21, C24, C27, C30, C33, and C36, where all coil sets are connected to each other, in forms of the Series circuit connecting end to end of each coil together, by connecting one end of the first coil to one end of the second coil, connecting the other end of the second coil to one end of the third coil, and connecting the other end of the third coil to the one end of the next coil respectively until reaching to the last coil of each set, and then connect the three coil sets (23) together, by means of connecting the last coil of the three coil sets (23) together and connecting the first coils of the three coil sets (23) together and to a control unit (8);

a control unit (8) as a box, containing a circuit board and electronic devices within, installed on the stator frame (4), determined to generate produced-electricity for use; and a cover (9), being in a circle shape with two opened end for being supported fluid flowing wherein its base has a plurality of holes for hooking up the cover with the stator frame (4), having a diameter larger than that of the outer circumference of the assembled coil sets (23), wherein the cover is determined to protect defects might being occurred to a parts of the stator (2) and attached to the stator frame (4) by a plurality of cover screws (11) and washers (12) determined to receive and distribute the load of the screws and protect damages might being occurred to the holes of the cover from the screws.

Figure 4:
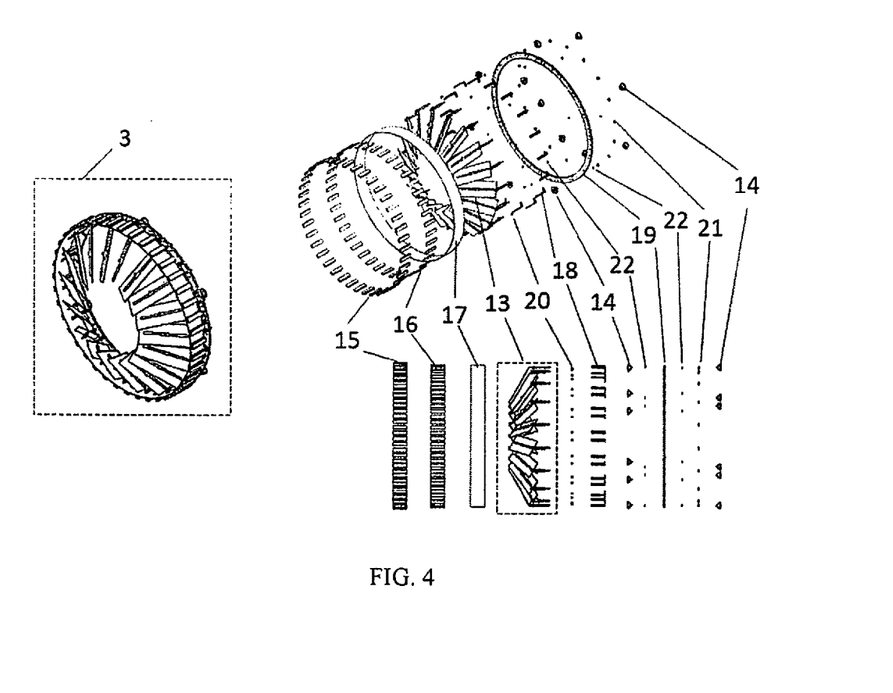
FIG. 4 illustrates one example of exploded view of the rotor of the shaftless horizontal axis wind turbine.
Figure 9:
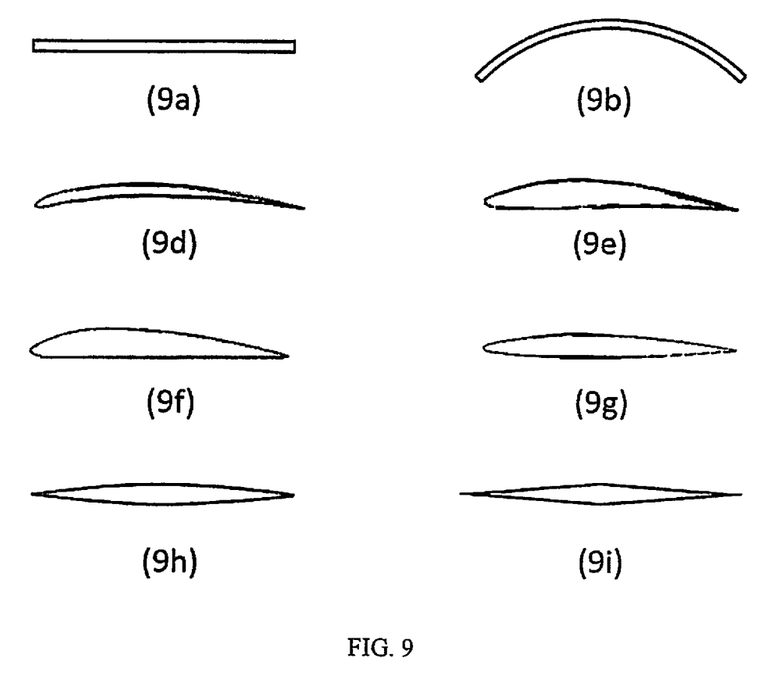
FIG. 9 illustrates one example of cross-section views of the blade used for the shaftless horizontal axis wind turbine.
Figure 10:
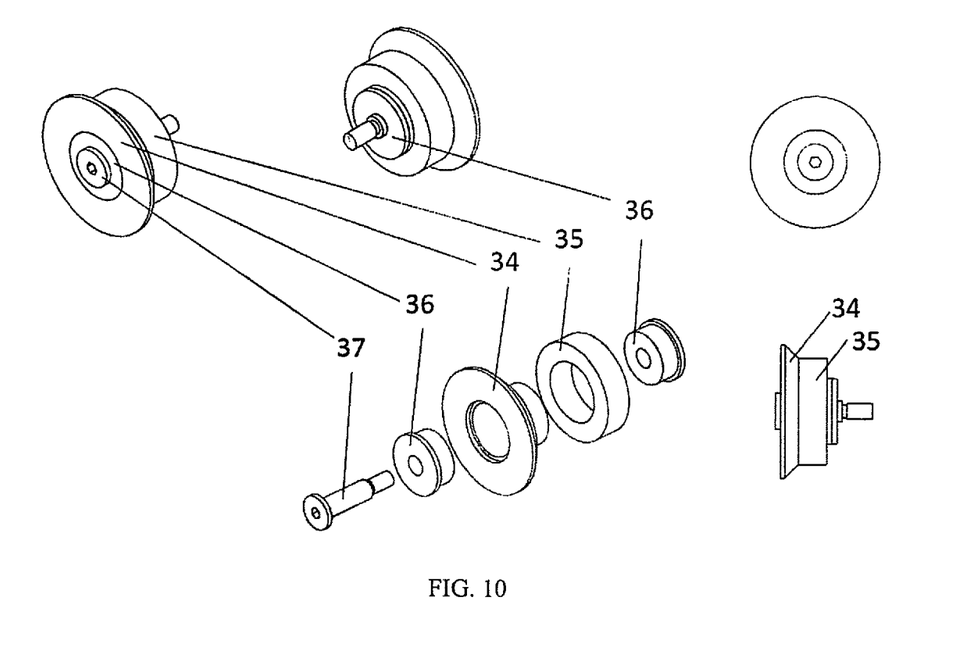
FIG. 10 illustrates one example of parts of a roller set of the shaftless horizontal axis wind turbine.
Figure 11:
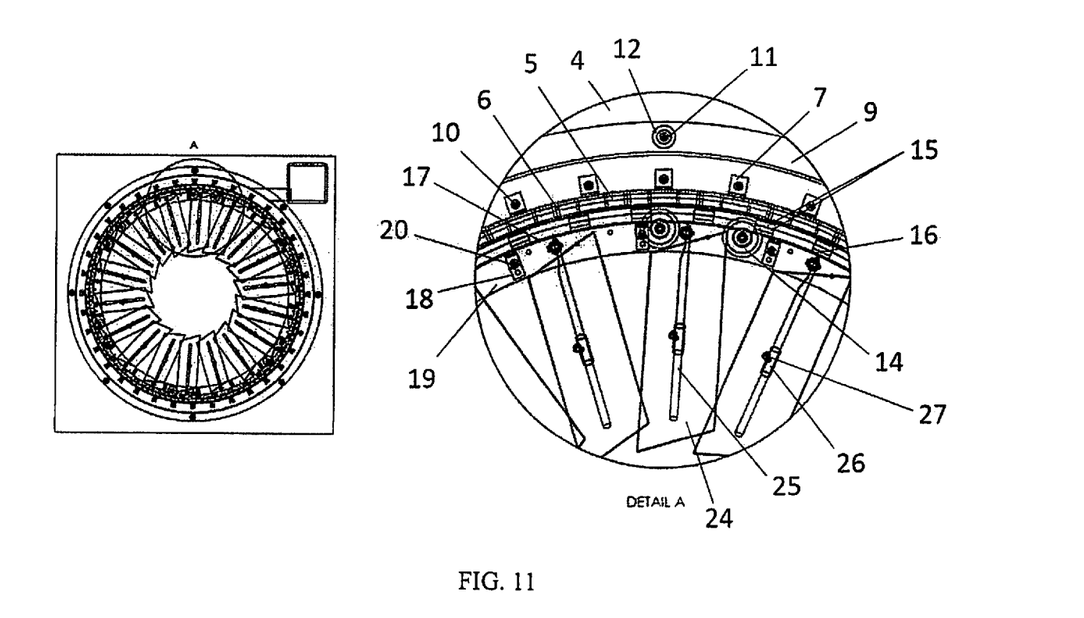
FIG. 11 illustrates one example of an extended view of the shaftless horizontal axis wind turbine.
Figure 12:
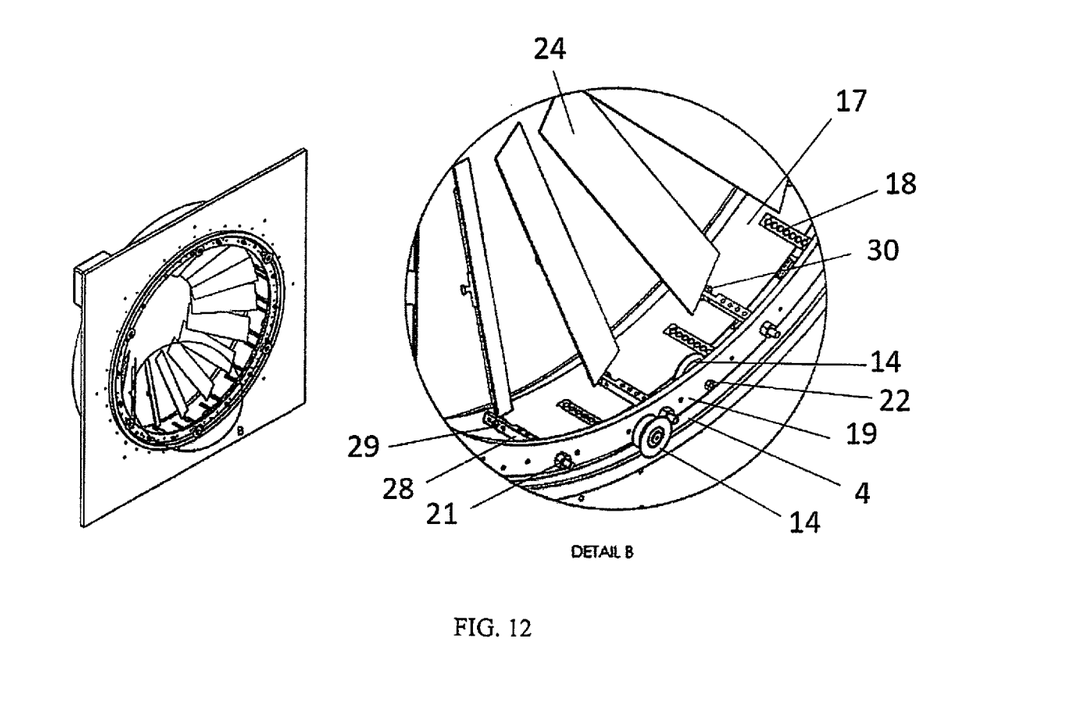
FIG. 12 illustrates another example of an extended view of the shaftless horizontal axis wind turbine.

FIG. 4 illustrates one example of parts of the rotor (3) of the shaftless horizontal axis wind turbine comprising:

a blade set (13) having a plurality of blades (24), being in any shape as shown in FIG. 9, wherein the blade (24) has one of cross-section shapes of rectangular (9a), curve (9b), early airfoil (9c), later airfoil (9d), Clark "Y" airfoil (9e), Lamina flow airfoil (9f), circular arc airfoil (9i), or double wedge airfoil (9i) determined to collide with the wind rotating the blade, by means of converting kinetic energy into mechanical energy to transfer the force to the rotor (3), preferably made of plastic, acrylic, aluminum, or Aluzinc coated metal having thickness of at least 1 millimeters (mm) in order to maintain its durability and not to be twisted and deformed while being hit by the wind, connected to a blade holder (26), as a hollow cylindrical tube containing at least a hole on its surface for attaching the screw (27), determined to hold a blade attaching shaft (25) rotatably twisting the blades (24) to make an acute angle ($\theta_R$) (33) for making a current flow of fluid (40) originated from a fluid current flow generator (39) to collide with the blades (24) and rotate the rotor (3);

the blade attaching shaft (25), being in a longer stick having a hole at one end, rotatably twistable to make an obtuse angle ($\theta_T$) (32) with respect to a rotor attaching shaft (28), being in a shorter stick, having two holes oppositely places at one end for being attached to a screw (29) and a nut (30), wherein at the hollow core of the rotor attaching shaft (28) a plurality of holes along the stick for reducing load to, strengthening, and protecting damages might be occurred to the shaft (28) during the use, wherein the blades (24) are adhered to the blade holder (26) by adhering material (31), being as a thin plate, preferably selected from high-strength adhesives namely super glue, epoxy, silicone glue or acrylic glue, or other welding materials namely iron, zinc, aluminum or plastic, and wherein the blade attaching shaft (25) and the blade holder (26) are preferably made of plastic, acrylic, metal, or wood, and wherein parts of the blade set (13) are able to be partly manufactured and assembled to be the blade set, or manufactured as one workpiece by molding, milling, cutting, 3D injection or 3D printing; and a roller unit (14), as shown in FIG. 10, having a plurality of supporting rollers (34), being as a thick ring with a slope outer ring surface at one edge for supporting two axes, attached to a plurality of weight bearing rollers (35), preferably made of natural or synthetic rubber, helping the rotor (3) rotate within the stator frame (4) without slipping while rotating;

a ball-bearing (36), attached to the supporting rollers (34) and the weight bearing rollers, determined to minimize friction and rotational stiffness of the roller unit (14) during the rotation of the rotor (3); and a roller axis (37), being as a stick, attached to the hole of a rotor frame (19) at one end and twisted to attach with the supporting rollers (34), the weight bearing rollers (35), and the ball-bearings (36) at the other end to the rotor frame (19) as well as rotating the roller unit (14).

According to FIG. 4, the roller unit (14) is installed at least three sets on the both sides of the rotor frame (19) at the rotor frame's holes where the rotor frame (19) is as a ring with a hollow core for receiving a current flow of fluid, ventilated from a ventilation system (41), and being able to flow through the shaftless turbine for generating electricity from the current flow of fluid without flowing backward to the fluid current flow generator (39), wherein the rotor frame (19) has a plurality of holes for being installed the roller unit (14) by a plurality of roller nuts (22) and roller axes (37) inserted through the hole on the rotor frame (19) determined to control the whole rotor (3) to rotate within the frame of the stator frame (4);

wherein a plurality of blade sets (13) are equally arranged and aligned along a radius of the rotor frame (19), by a plurality of rotor attaching shafts (28) being inserted to the holes of the rotor frames (19) on the side as the outer location of fluid current flow and by blade attaching nuts (21) on the other side; and a plurality of magnets (15), being as a rectangular stick, determined to create magnetic force lines intersecting the coils to create the induced electromotive force (emf), installed on a plurality of magnetic pickup metal plates at the same numbers of the magnets (16) coated with a rust-proof agent or paint with a thickness equal to or greater than that of the magnets (15), and attached at the outer circumference of a hollow magnetic attaching frame (17) connected at the rotor frame (19) with a plurality of L-shape rotor frame's holders (18) wherein the shorter part contains a hole for hooking up the rotor frame (19) by a plurality of screws (20) and the longer part contains a plurality of holes for hooking up the hollow magnetic attaching frame (17) at its inner circumference by adhering material; and wherein the magnets (15), attached to the frame (17) and the rotor frame holder (19), roundly moves through the coil sets (23) installed on the stator frame (4), generating electricity for use wherein the magnetic pickup metal plates (16) play a role in reflecting the magnetic force lines of the magnets (15) to flow into the side of the coil set (23) in order to increase a degree of magnetic field strength acting on the coil set (23) and generate more electricity.

Figure 13:
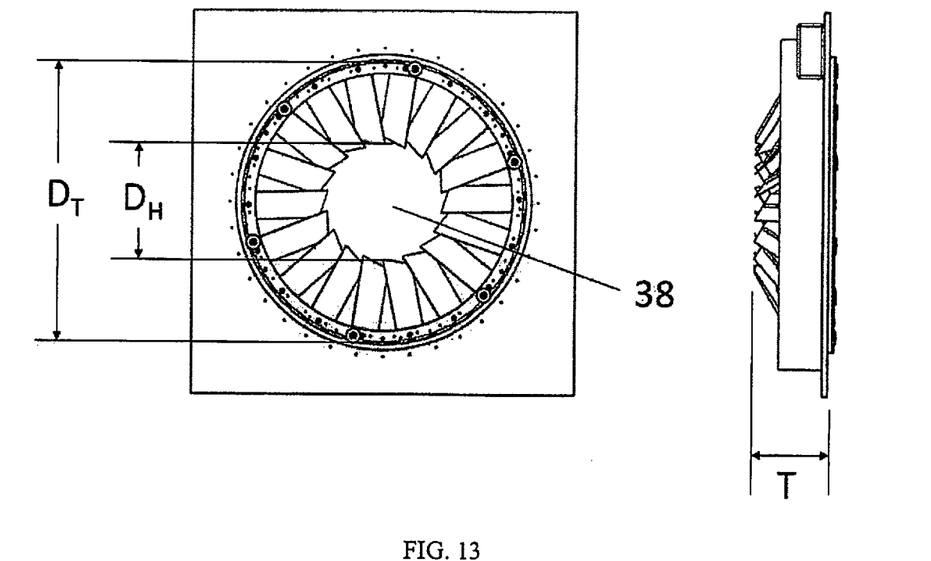
FIG. 13 illustrates one example of a ratio in terms of size of parts of the shaftless horizontal axis wind turbine.
Figure 14:
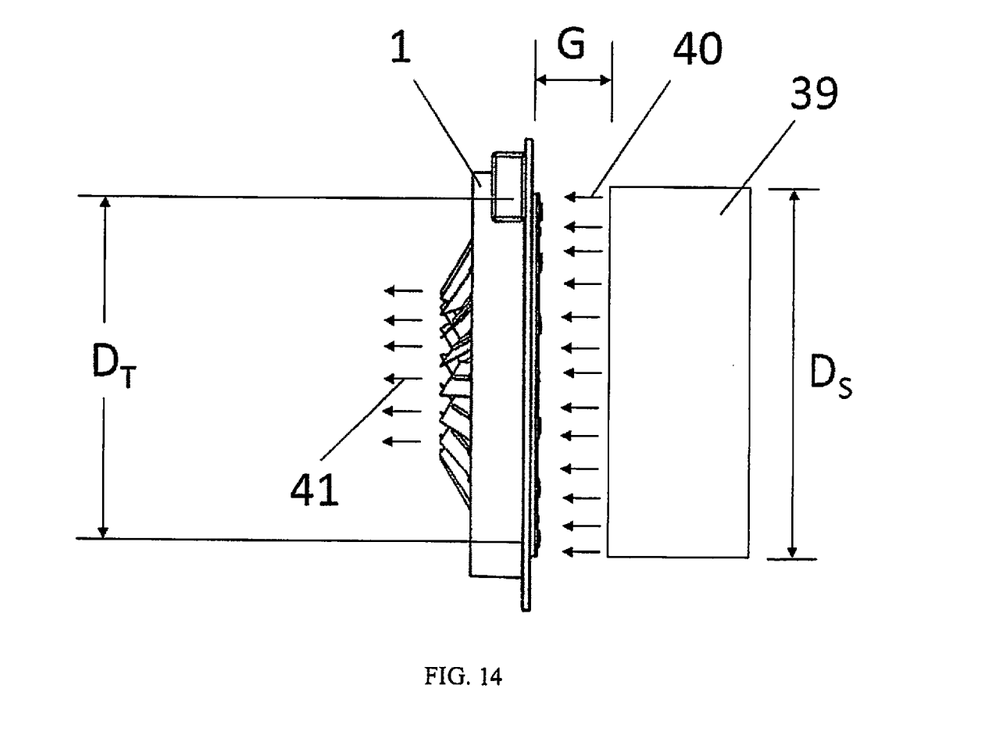
FIG. 14 illustrates one example of a ratio in terms of size between parts of the shaftless horizontal axis wind turbine and a fluid current flow generator

The shaftless horizontal axis wind turbine for generating electricity from the current flow of fluid characterizes in that:

the blade (24) is rotatably twistable to make an obtuse angle ($\theta_T$) (32) between the blade attaching shaft (25) and the rotor attaching shaft (28) and to make an acute angle ($\theta_R$) (33) between the blade (24) and the blade attaching shaft (25) causing a bent of the blade to the outer location as the same direction of fluid flow; and the blade (24) has a given length producing a space (38), as in the diameter of $D_H$ having at least a quarter of the diameter of $D_T$ of the turbine, according to FIG. 13 that the current flow of fluid (40) is ventilated from a ventilation system (41) for generating electricity from the current flow of fluid to the outer location without flowing backward to the fluid current flow generator (39), as shown in FIG. 14, and drive the rotor (3) to rotate.

The shaftless horizontal axis wind turbine for generating electricity from the current flow of fluid is able to be being applied to any fluid flow stream such as natural wind, exhaust air from a ventilation system with a fan is the power source to ventilate the fluid flow from one location to another, or liquid drained through pipelines by a mechanical power unit or by gravity, etc.

Figure 15:
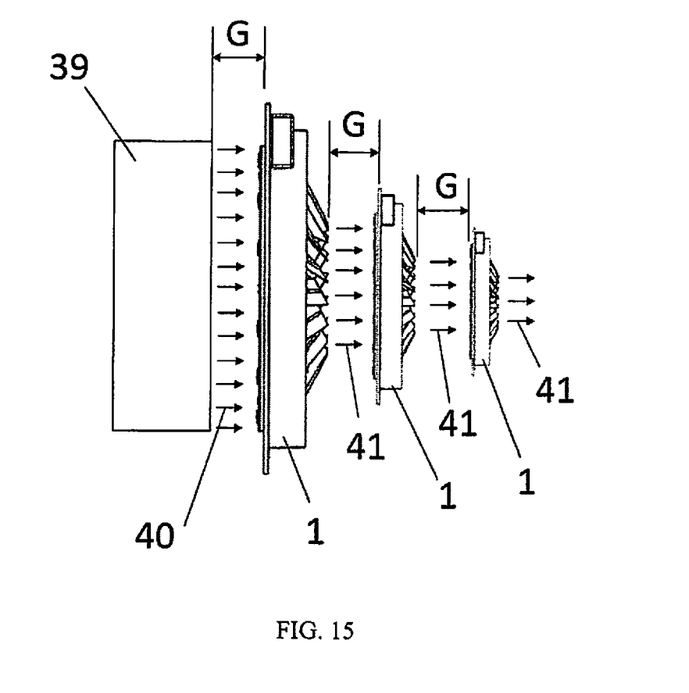
FIG. 15 illustrates one example of an installation method of the shaftless horizontal axis wind turbine in case there is no installation problem of confined space.

FIG. 15 illustrates one example of an installation method of the shaftless horizontal axis wind turbine for generating electricity from the current flow of fluid, in case there is no installation problem of confined space. Furthermore, the shaftless horizontal axis wind turbine according to the invention, having a smaller size, is able to be placed next to the larger turbine in order to receive the fluid flow current, ventilated from the larger turbine (41), as a power source to drive the rotor (3) for further generating electricity.

Figure 16:
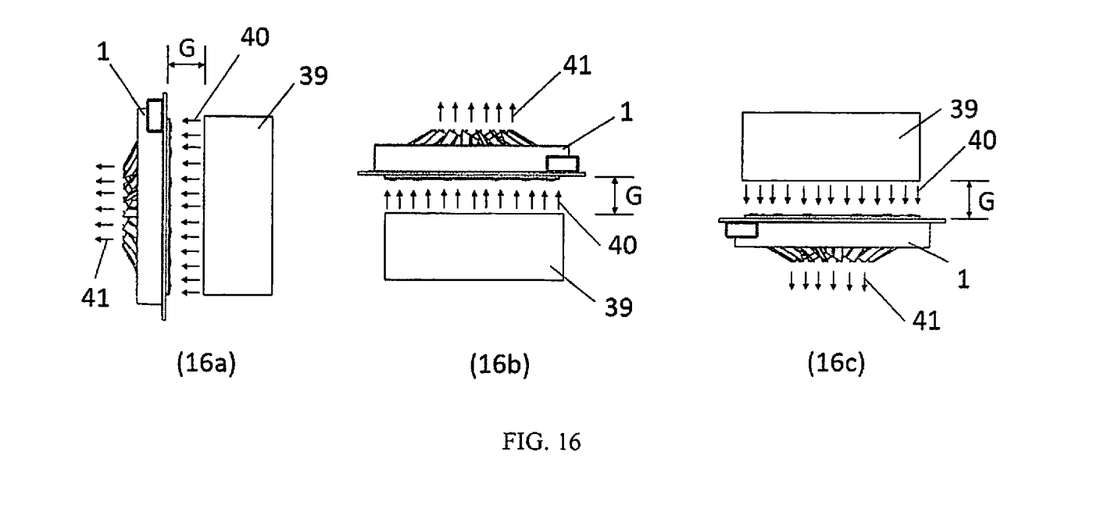
FIG. 16 illustrates one example of installation positioning of the shaftless horizontal axis wind turbine.

FIG. 16 illustrates one example of installation positioning of the shaftless horizontal axis wind turbine for generating electricity from the current flow of fluid according to the invention, wherein the turbine is capable of being installed in the direction of the fluid flow ventilated from the fluid current flow generator (39) at the horizontal axis as shown in 16a, or at the vertical axis from bottom-to-top as shown in 16b, or at the vertical axis from top-to-bottom as shown in 16c, wherein the distance (G) between the blades of the fluid current flow generator (39) and the shaftless horizontal axis wind turbine at or more than 2 millimeters (mm).

Figure 17:
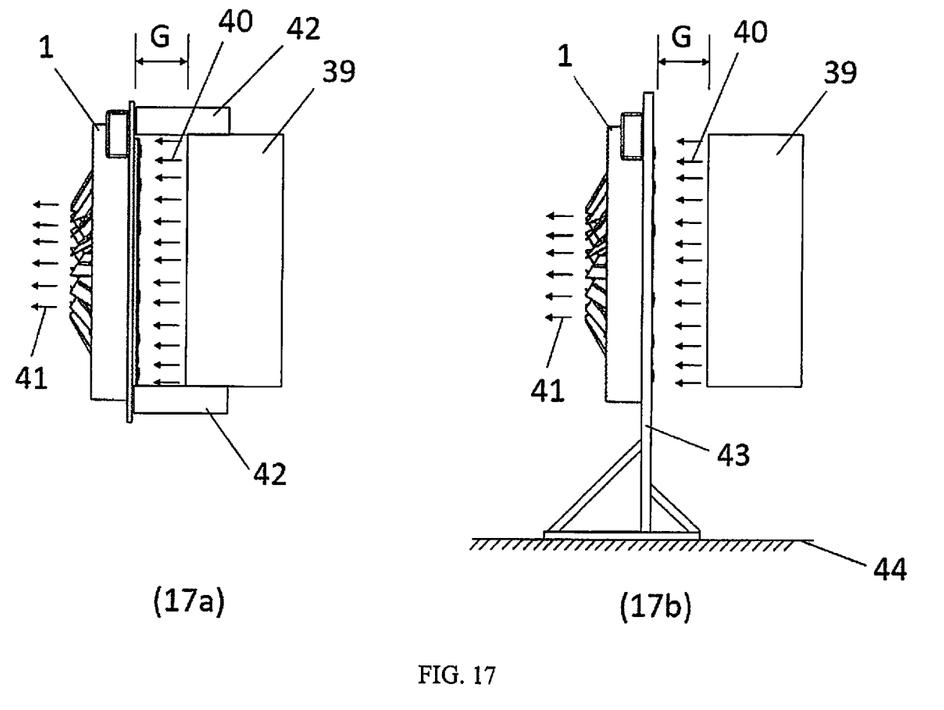
FIG. 17 illustrates one example of an installation method of the shaftless horizontal axis wind turbine.

FIG. 17 illustrates one example of an installation method of the shaftless horizontal axis wind turbine for generating electricity for use from the current flow of fluid according to the invention, wherein the turbine is able to be installed by directly attaching to the fluid current flow generator (39) with a turbine holder (42) as shown in 17a, or on a mounting base (43) on the floor or against the wall (44) independently separated from the fluid current flow generator as shown in 17b.

What is claimed is:

1. A shaftless horizontal axis wind turbine for generating electricity from a flow of fluid, the shaftless horizontal axis wind turbine comprising:

a stator comprising:

a stator frame having a plurality of thin plates containing a circular-shape aperture, a plurality of holes installed around the aperture for supporting a plurality of coil screws attaching a coil set to the stator frame;

the coil set comprising a conductive coil coated with anti-electrical or chemical reaction materials,
wherein the coil set is coated with anti-electrical or chemical reaction materials,
wherein the anti-electrical or chemical reaction materials are made by non-conductive and anti-corrosion resin protecting the electrical or chemical reactions with the conductive coil,
wherein the coil set is attached to a plurality of L-shape coil-holders
wherein the coil set is arranged as a circle and electrically connected as a 3-phase circuit of a star connection, wherein the 3-phase circuit is to separate the coil set into three coil sets, and
wherein the three coil sets are connected in a series circuit by:
connecting each coil end to end until reaching a last coil of each coil set,
connecting the three coil sets together by connecting a last coil of the three coil sets together and connecting a first coil of the three coil sets together, and
connecting the three coil sets to a control unit, wherein the control unit contains a circuit board and electronic devices; and
a cover comprising a base having a plurality of holes for attaching the cover with the stator frame, wherein the cover comprises a diameter larger than an outer circumference of the assembled coil sets;
a rotor comprising:
a blade set comprising a plurality of blades connected to a blade holder,
wherein the blade holder comprises a hollow cylindrical tube containing at least a hole,
wherein the blade holder is configured to hold a blade attaching shaft,
wherein the blade attaching shaft is configured to allow a blade of the plurality of blades to rotate with respect to the blade attaching shaft,
wherein the plurality of blades are adhered to the blade holder by adhering material,
wherein the blade attaching shaft rotatably attaches to a rotor attaching shaft that is shorter in length than the blade attaching shaft,
wherein the rotor attaching shaft is configured to rotate with respect to the blade attaching shaft, and
wherein rotation of the blade and rotation of the rotor attaching shaft occur on different axes of the blade attaching shaft;
a rotor frame operatively connected to the rotor;
a roller unit connected to the rotor frame, wherein the roller unit comprises:
a plurality of supporting rollers configured as a ring with a slope outer ring surface;
a plurality of weight bearing rollers attached to the plurality of supporting rollers to assist the rotor to rotate within the stator frame;
a ball-bearing attached to the plurality of supporting rollers and the plurality of weight bearing rollers, wherein the ball-bearing is configured to minimize friction and rotational stiffness of the roller unit during rotation of the rotor; and
a roller axis attached to the rotor, the plurality of supporting rollers, the plurality of weight bearing rollers, and the ball-bearing,
wherein the roller unit is configured to control the rotation of the rotor, and
wherein a plurality of blade sets are equally arranged and aligned along a radius of the rotor frame by a plurality of rotor attaching shafts;
a plurality of magnets attached to the rotor frame, wherein the plurality of magnets are configured to create magnetic force lines intersecting the conductive coil to generate electricity;
a plurality of magnetic pickup metal plates attached to the plurality of magnets, wherein the magnetic pickup metal plates are coated with a rust-proof agent or paint with a thickness equal to or greater than that of each magnet of the plurality of magnets; and
a hollow magnetic attaching frame connected to the plurality of magnetic pickup metal plates and to the rotor frame,
wherein the plurality of magnets is configured to move through the coil set installed on the stator frame,
wherein the plurality of magnets are configured to generate electricity, and
wherein the plurality of magnetic pickup metal plates are configured to reflect magnetic field lines of the plurality of magnets to flow into the coil set.

2. The shaftless horizontal axis wind turbine of claim 1, wherein the stator frame is made of plastic, acrylic, or aluminum.

3. The shaftless horizontal axis wind turbine of claim 1, wherein the plurality of blades comprise plastic, acrylic, aluminum, or Aluzinc coated metal.

4. The shaftless horizontal axis wind turbine of claim 1, wherein the blade has a cross-section in any shape.

5. The shaftless horizontal axis wind turbine of claim 1, wherein the adhering material comprises (i) high-strength adhesives comprising epoxy, silicone glue, or acrylic glue, or (ii) welding materials comprising iron, zinc, aluminum, or plastic.

6. The shaftless horizontal axis wind turbine of claim 1, wherein the blade attaching shaft and the blade holder comprise plastic, acrylic, metal, or wood.

7. The shaftless horizontal axis wind turbine of claim 1, wherein the weight bearing roller comprises natural or synthetic rubber.

8. The shaftless horizontal axis wind turbine of claim 1, wherein the blade is oriented (i) to make an obtuse angle ($\theta_T$) between the blade attaching shaft and the rotor attaching shaft, and (ii) to make an acute angle ($\theta_R$) between the blade and the blade attaching shaft, and
wherein the blade is configured to produce a space for ventilating the flow of fluid, and to allow the flow of fluid to flow through the shaftless horizontal axis wind turbine without flowing backward to a fluid current flow generator.

9. The shaftless horizontal axis wind turbine of claim 3, wherein the blade has a cross-section in any shape.

* * * * *